US012689295B2

(12) United States Patent
Wen et al.

(10) Patent No.: US 12,689,295 B2
(45) Date of Patent: Jul. 21, 2026

(54) POWER CONVERTER AND SLOPE SIGNAL GENERATOR AND SLOPE SIGNAL GENERATION METHOD THEREOF

(71) Applicant: Joulwatt Technology Co., Ltd., Hangzhou (CN)

(72) Inventors: Haitao Wen, Hangzhou (CN); Yao Lu, Hangzhou (CN); Zhi Li, Hangzhou (CN)

(73) Assignee: Joulwatt Technology Co., Ltd., Hangzhou (CN)

(*) Notice: Subject to any disclaimer, the term of this patent is extended or adjusted under 35 U.S.C. 154(b) by 213 days.

(21) Appl. No.: 18/778,921

(22) Filed: Jul. 20, 2024

(65) Prior Publication Data

US 2025/0030341 A1 Jan. 23, 2025

(30) Foreign Application Priority Data

Jul. 20, 2023 (CN) .......................... 202310893501.6

(51) Int. Cl.
H02M 3/158 (2006.01)
H02M 1/08 (2006.01)
H02M 1/14 (2006.01)

(52) U.S. Cl.
CPC ............. *H02M 3/158* (2013.01); *H02M 1/08* (2013.01); *H02M 1/14* (2013.01)

(58) Field of Classification Search
CPC ............. H02M 1/0009; H02M 1/0025; H02M 1/0029; H02M 1/08; H02M 1/14;
(Continued)

(56) References Cited

U.S. PATENT DOCUMENTS

| | | | | |
|---|---|---|---|---|
| 7,605,574 B2 * | 10/2009 | Dearn | ................... | H02M 3/156 323/284 |
| 10,833,661 B1 * | 11/2020 | Archibald | .............. | H03K 3/017 |

FOREIGN PATENT DOCUMENTS

CN 115242087 A 10/2022

OTHER PUBLICATIONS

CN 202310893501.6 first office action dated Aug. 30, 2023.
(Continued)

*Primary Examiner* — Crystal L Hammond
*Assistant Examiner* — Nicolas Alden Chapa Mills
(74) *Attorney, Agent, or Firm* — IPro, PLLC

(57) ABSTRACT

This disclosure relates to a power converter, a slope signal generator and a slope signal generation method thereof. The power converter comprises an inductor and a switch transistor coupled between the input terminal and the output terminal. The slope signal generator comprises: a proportion transformation circuit, for performing proportion transformation on the current sense signal of the inductor to obtain a replicated signal; and an offset compensation circuit, for performing offset compensation on the replicated signal to obtain a slope signal, wherein the slope change of the slope signal characterizes the inductance value change of the inductor. The slope signal generator of the power converter can adaptively adjust the slope of the slope signal during the switching cycle, dynamically compensate for the fluctuation of the inductance value, improve the effect of suppressing subharmonic oscillation, thus enhancing the input and output voltage range and stability of the power converter.

20 Claims, 9 Drawing Sheets

200

(58) Field of Classification Search
CPC ........ H02M 1/44; H02M 3/156; H02M 3/158;
H02M 3/1582; Y02B 70/10
See application file for complete search history.

(56) References Cited

OTHER PUBLICATIONS

Liu, Pang-Jung, and Che-Wei Chang. "CCM noninverting buck boost converter with fast duty-cycle calculation control for line transient improvement." IEEE Transactions on Power Electronics 33.6 (2017): 5097-5107.
Zhang, Yu, et al. "An Adaptive Slope Compensation Circuit for Boost Converter." Microelecronics 52.5 (Oct. 2022): 772-776.

* cited by examiner

100

201a

201b

500

POWER CONVERTER AND SLOPE SIGNAL GENERATOR AND SLOPE SIGNAL GENERATION METHOD THEREOF

CROSS-REFERENCE TO RELATED APPLICATION

This application claims priority to Chinese patent application No. 202310893501.6, filed on Jul. 20, 2023, and entitled "POWER CONVERTER AND SLOPE SIGNAL GENERATOR AND SLOPE SIGNAL GENERATION METHOD THEREOF", published as CN116633138A on Oct. 22, 2023, the entire contents of which are incorporated by reference.

FIELD

The present disclosure relates to a technical field of power supply, more particularly, to a power converter and a slope signal generator and a slope signal generation method thereof.

BACKGROUND

In electronic products, power converters have been widely used to provide power supply voltage for electronic devices within the electronic products. For example, if the power supply voltage of the electronic device is higher than the battery voltage, a power converter is used to convert the battery voltage into the power supply voltage for electronic device to make it work correctly.

The power converter controls the electric energy transferred from the input terminal of the power converter to the output terminal by controlling the switching action of switch devices (such as transistors, IGBTs, MOSFETs, etc.), thereby obtaining the desired output voltage and/or output current. The control of the switch states of switch devices can be achieved through various control strategies and modulation techniques, such as pulse width modulation (PWM), pulse frequency modulation (PFM), and pulse position modulation (PPM), etc.

In the case of using pulse width modulation (PWM) to achieve switch control, the power converter based on fixed-frequency peak current control scheme has inherent harmonic oscillation problems when the duty cycle of the switch control signal is greater than 50%, which makes the power converter operate unstably. For application scenarios with high requirements for battery endurance, such as portable electronic products, not only the battery voltage has a large range of change, but also the power supply voltage of electronic products needs to meet the requirements of high efficiency and high dynamics. Therefore, the duty cycle of the switch control signal needs to vary over a large range, which further exacerbates the problem of subharmonic oscillation.

FIG. 1 shows a schematic circuit diagram of a power converter according to prior art. The power converter 100 adopts a BOOST topology, e.g., including a control circuit 110, which generates switch control signals Vgs1 and Vgs2 based on the current sense signal Vsen of the inductor current iL and the voltage feedback signal Vfb of the output voltage Vo. In order to suppress subharmonic oscillation, the control circuit 110 further comprises a slope signal generator 101 for generating a slope signal Vslope. The current sense signal Vsen is superimposed with the slope signal Vslope to generate a superimposed signal Vs1. The slope signal Vslope is for compensating the slope of the current sense signal Vsen, to make the slope of the superimposed signal Vs1 increase with respect to the slope of the current sense signal Vsen, which can reduce the occurrence of the subharmonic oscillation, and extend the duty cycle range of the switch control signal.

In the existing power converter 100, the slope signal generator 101 generates a slope signal with a fixed slope or multiple slopes, and adjusts the slope of the current sense signal Vsen. The control circuit of the power converter 100 can solve the problem of harmonic oscillation under the peak current mode control, but it can also cause overcompensation, weaken the dynamic response speed and load capacity of the system. Moreover, the control circuit of the power converter 100 is designed for specific inductance parameters, which not only limits the application scenarios of the control circuit, but also changes the inductance value under different temperatures and currents, with a maximum variation up to 40%. In severe cases, it can lead to subharmonic oscillation problems again in high temperature and heavy load. In addition, when the converter operates for long time, the inductance will also age slowly over time, ultimately leading to the failure of the initially set slope compensation scheme and causing subharmonic oscillation problems, and the system is unable to operate stably.

Therefore, it is expected to further improve the slope signal compensation scheme of the power converter to overcome the above technical problems existing in existing technologies.

SUMMARY

In view of this, an objective of the present invention is to provide a power converter and a slope signal generator and a slope signal generation method thereof, to perform proportion transformation on the current sense signal of the inductor to obtain a duplicate signal, and to perform offset compensation on the duplicate signal to obtain a slope signal, so as to improve the input and output voltage range and stability of the power converter.

According to an aspect of the present invention, a slope signal generator for a power converter is provided, the power converter comprising an inductor and a switch transistor coupled between the input terminal and the output terminal, and the slope signal generator comprises: a proportion transformation module, for performing proportion transformation on a current sense signal of the inductor to obtain a replicated signal; and an offset compensation module, for performing offset compensation on the replicated signal to obtain a slope signal, wherein slope change of the slope signal characterizes an inductance value change of the inductor.

Optionally, the offset compensation module comprises: a sampling and holding module, for obtaining a sampling signal of the current sense signal at a predetermined sampling time; and a subtraction module, for subtracting the sampling signal from the current sense signal to perform offset compensation.

Optionally, the offset compensation module comprises: a sampling and holding module, for obtaining a sampling signal of the replicated signal at a predetermined sampling time; and a subtraction module, for subtracting the sampling signal from the replicated signal to perform offset compensation.

Optionally, the sampling time is any time selected between a start time of a switching cycle of the power converter and a half-cycle time of the switching cycle of the power converter.

Optionally, the offset compensation module samples and calculates a digital value of the current sense signal or the replicated signal at the sampling time of the switching cycle, and providing the slope signal after the sampling time of the switching cycle.

Optionally, the input terminal of the sampling and holding module is connected to a first switch, and the output terminal of the subtraction module is connected to a second switch; the first switch and the second switch perform switching synchronously, so as to sample and calculate an analog value of the current sense signal or the replicated signal at the sampling time of the switching cycle, and provide the slope signal after the sampling time of the switching cycle.

Optionally, the slope signal Vslope is as the following formula:

$$V\text{slope}=k*(a-1)*V\text{sen}-V\text{offset}$$

wherein Vsen denotes the current sense signal of the inductor, Voffset denotes the offset compensation signal corresponding to the current valley value of the inductor, a denotes a first circuit parameter of the slope signal generator, and k denotes a second circuit parameter of the slope signal generator.

Optionally, the first circuit parameter is related to the input voltage and the output voltage of the power converter.

Optionally, the slope signal generator further comprises: an analog-to-digital converter, for converting an analog value of the current sense signal into a digital value; and a digital-to-analog converter, for converting the digital value of the slope signal into an analog value, wherein, the proportion transformation module receives the digital value of the current sense signal, and performs numerical calculations on the current sense signal to obtain the digital value of the replicated signal.

Optionally, the first circuit parameter and the second circuit parameter of the slope signal generator are proportion coefficients of the proportion transformation module, and the proportion coefficients of the proportion transformation module are set to meet the harmonic suppression condition: k is greater than ½.

Optionally, the first circuit parameter of the slope signal generator is a predetermined parameter related to a rated input voltage and a rated output voltage of the power converter.

Optionally, the proportion transformation module comprises: an operational amplifier, and the second circuit parameter of the slope signal generator is the proportion coefficient of the operational amplifier.

Optionally, the parameters of the passive components in the proportion transformation module are set to meet the harmonic suppression condition: k is greater than ½.

Optionally, the first circuit parameter of the slope signal generator is a real time parameter related to the input voltage and the output voltage collected by the power converter in real time.

Optionally, the proportion transformation module comprises: a multiplication module, for multiply the current sense signal and the output voltage to obtain a first signal; a division module, for dividing the first signal by the input voltage to obtain a second signal; and an adder module, for adding the second signal to the current sense signal to obtain a third signal.

Optionally, the proportion transformation module comprises: a division module, for dividing the current sense signal by the input voltage to obtain a first signal; a multiplication module, for multiplying the first signal and the output voltage to obtain a second signal; and an adder module, for adding the second signal to the current sense signal to obtain a third signal.

Optionally, the multiplication module and the division module comprise the active device selected from the multiplier respectively; the division module, the multiplication module, and the adder module respectively comprise the passive device selected from at least one of the resistors and capacitors.

Optionally, the parameters of the active device and/or the passive device of the proportion transformation module are set to meet the subharmonic suppression condition: k is greater than ½.

According to another aspect of the present invention, a power converter is provided, which comprises: an input terminal and an output terminal, receiving input voltage and providing output voltage respectively; an inductor and a switch transistor coupled between the input terminal and output terminal; and a control circuit, for generating a switch control signal of the switch transistor, charging the inductor with the input voltage in the on state of the switch transistor, and discharging the inductor in the off state of the switch transistor, so the output terminal generates the output voltage, wherein, the control circuit comprises the aforesaid slope signal generator.

Optionally, the power converter uses peak current control manner or valley current control manner.

Optionally, the power converter comprises any one of the power converters selected from the BOOST topology, BUCK topology, BUCK-BOOST topology, and FLYBACK topology.

According to another aspect of the present disclosure, a slope signal generation method of a power converter is provided, and the power converter comprises an inductor and a switch transistor coupled between an input terminal and an output terminal, and the slope signal generation method comprises: performing proportion transformation on a current sense signal of the inductor to obtain a replicated signal; and performing offset compensation on the replicated signal to obtain a slope signal, wherein the slope change of the slope signal characterizes change of inductance value of the inductor.

Optionally, the offset compensation comprises: obtaining the sampling signal of the current sense signal at the predetermined sampling time; and subtracting the sampling signal from the current sense signal.

Optionally, the offset compensation comprises: obtaining the sampling signal of the replicated signal at the predetermined sampling time; and subtracting the replicated signal by the sampling signal.

Optionally, the sampling time is any time selected between a start time of a switching cycle of the power converter and a half-cycle time of the switching cycle of the power converter.

Optionally, the slope signal Vslope is as in the following formula:

$$V\text{slope}=k*(a-1)*V\text{sen}-V\text{offset}$$

wherein Vsen denotes the current sense signal of the inductor, Voffset denotes the offset compensation signal corresponding to the current valley value, a denotes the first circuit parameter of the slope signal generator, and k denotes the second circuit parameter of the slope signal generation.

Optionally, numerical calculation is performed in the proportion transformation and numerical calculation parameters are set to meet the subharmonic suppression condition: k is greater than ½.

Optionally, in the proportion transformation, the parameters of the active device and/or passive devices in the slope signal generator are set to meet the subharmonic suppression condition: k is greater than ½.

In the slope signal generator and the slope signal generation method for a power converter according to an embodiment of the present invention, the current sense signal of the inductor is proportionally transformed to obtain a replicated signal, and offset compensation is performed on the replicated signal to obtain a slope signal. The slope signal generator of the power converter can adaptively adjust the slope of the slope signal during the switching cycle, thus quickly and dynamically compensating for the fluctuation of inductance value, improving the effect of suppressing subharmonic oscillation, thereby increasing the input and output voltage range of the power converter, as well as the stability under different temperature and load conditions.

In a preferred embodiment, the slope signal generator adopts an analog solution to select the device parameters of the active and/or passive components in the slope signal generator to ensure that the slope signal generator always meets the subharmonic suppression conditions. The slope signal generation circuit utilizes the selection of device parameters in the simulator to adaptively adjust the slope of the slope signal during the switching cycle. On one hand, due to the use of analog solutions in the slope signal generator, there is no need to use analog-to-digital converters or analog-to-digital converters for signal conversion, nor is there a need to use numerical calculation units to perform multi-level digital operations. On the other hand, since the slope signal generator always meets the subharmonic suppression conditions, it does not need to design different circuit structures for power converters of different specifications (such as different inductance values). Therefore, the slope signal generator can simplify the circuit structure and significantly reduce circuit design costs.

In a preferred embodiment, the slope signal generation circuit generates a slope signal based on input voltage, output voltage, and current detection signals collected in real time. Therefore, it can quickly and dynamically compensate for large-scale fluctuations in input voltage, output voltage, and inductance value, which not only improves the stability of the power converter under different temperature and load conditions by dynamically compensating for inductance value, but also expands the input and output voltage range of the power converter by dynamically compensating for the input voltage and output voltage. In addition, it can also eliminate aging offset of inductance value during long-term operation. Since the slope signal generated by the slope signal generation circuit always meets the subharmonic suppression conditions, it can avoid the problem of slow dynamic response speed caused by overcompensation.

6

Figure 3:
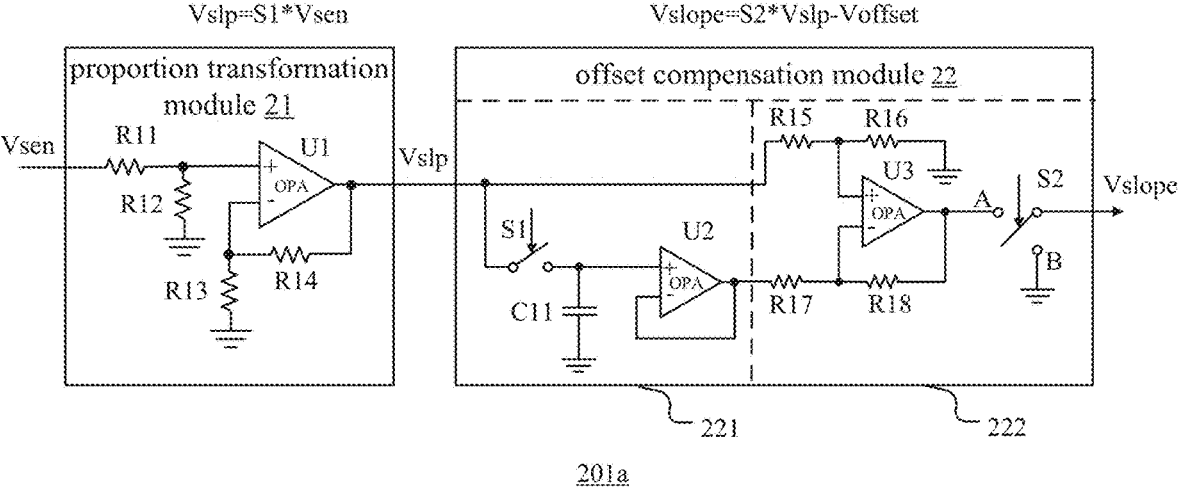
FIG. 3 shows a schematic circuit diagram of the first embodiment of the slope signal generator in the power converter shown in FIG. 2.
Figure 5:
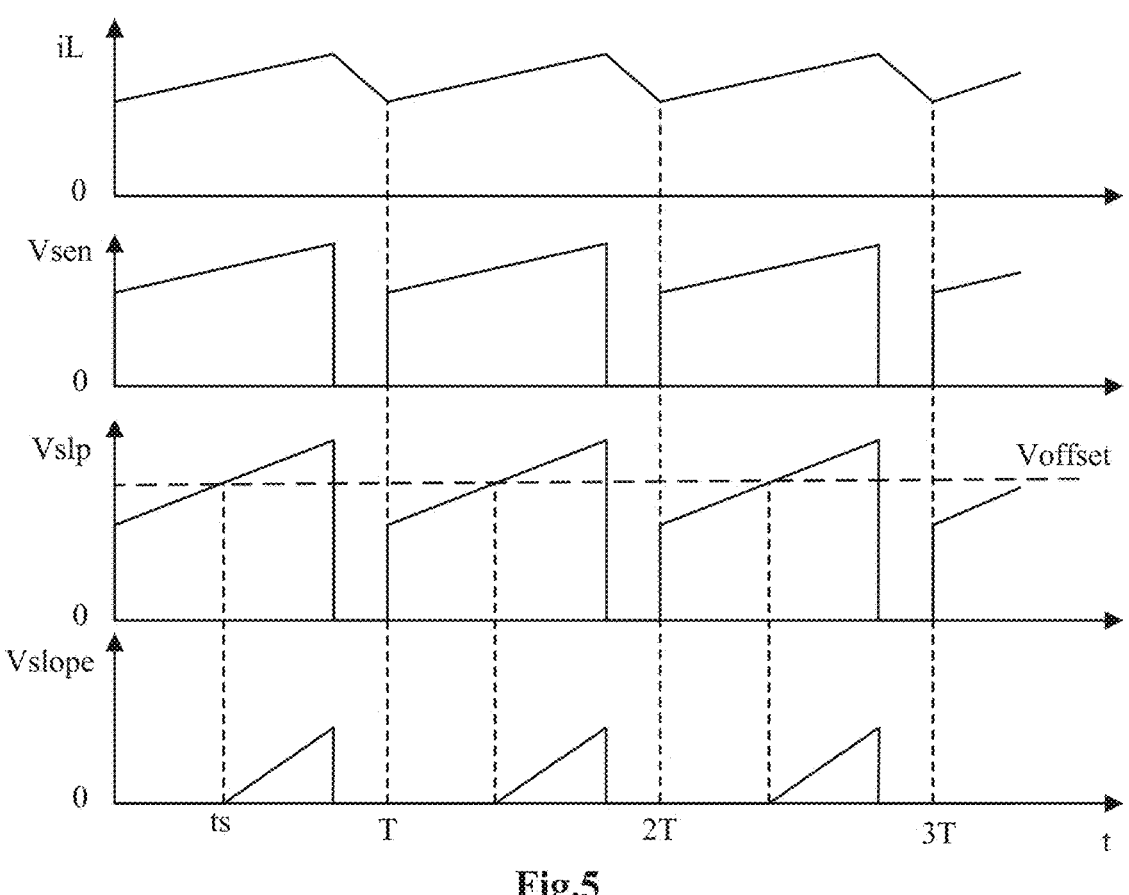
Figure 6:
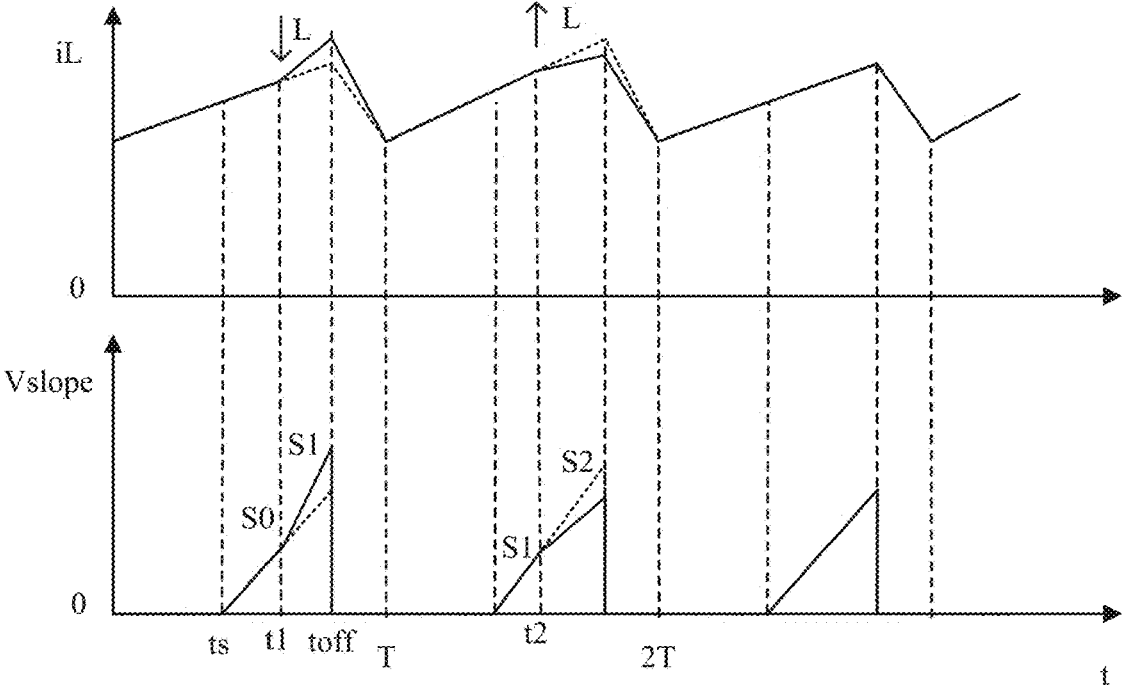
Figure 7:
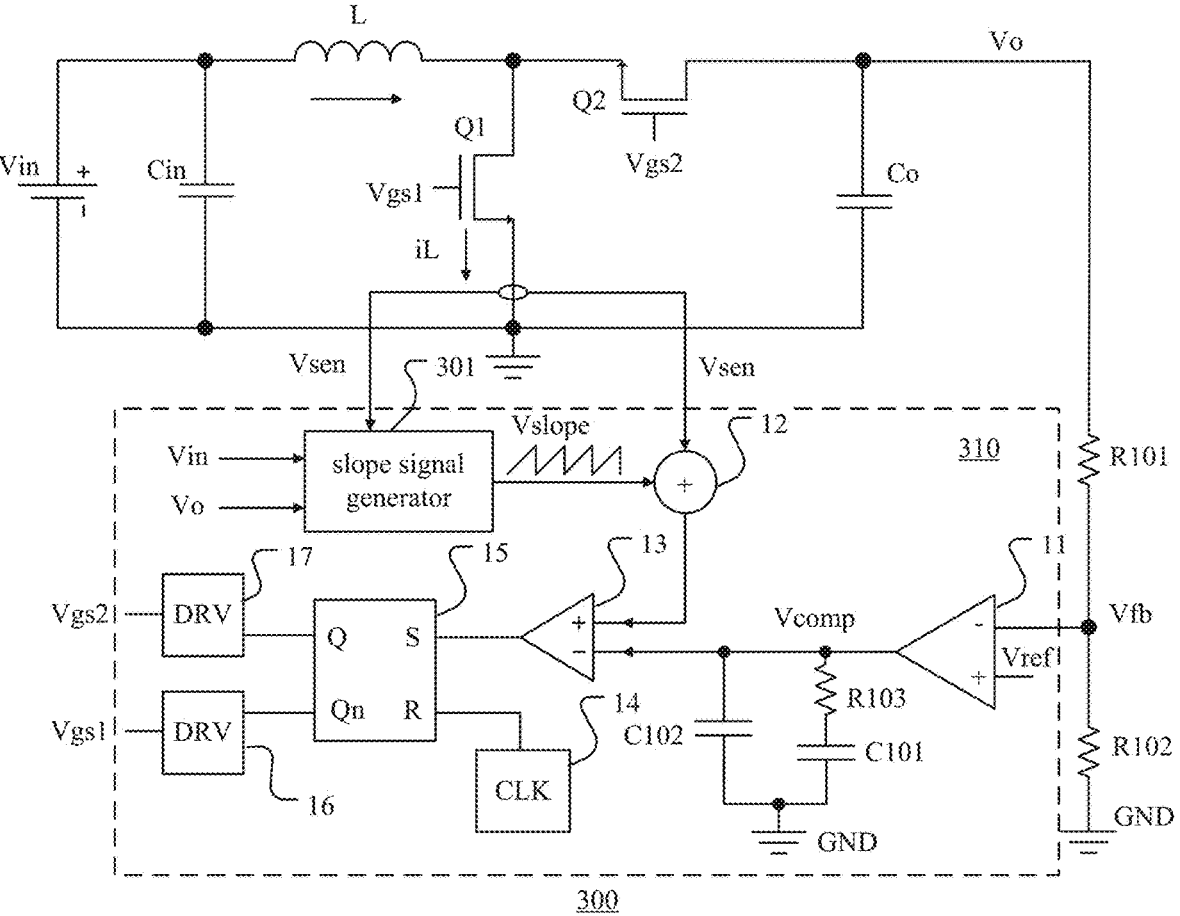
Figure 8:
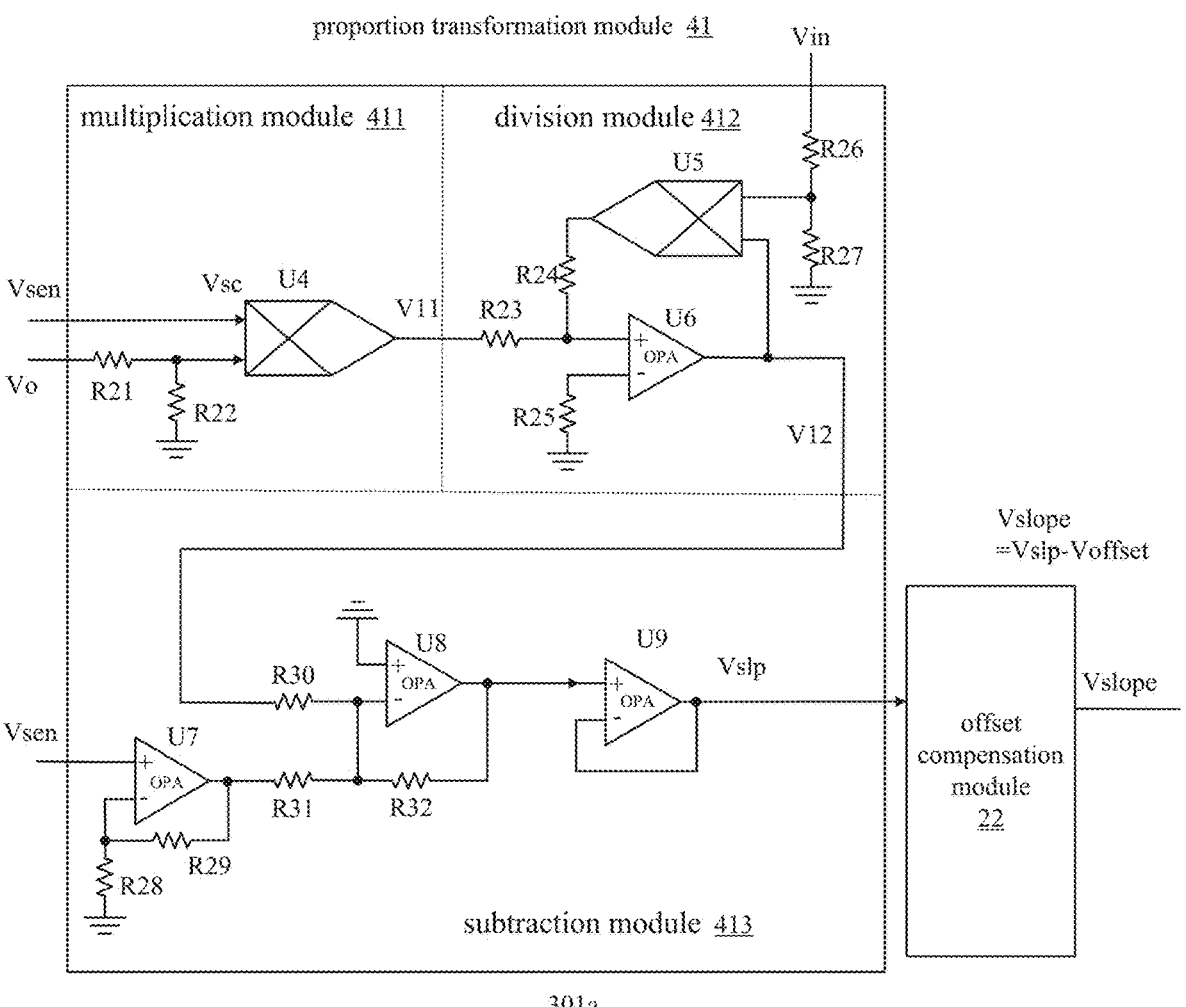
Figure 9:
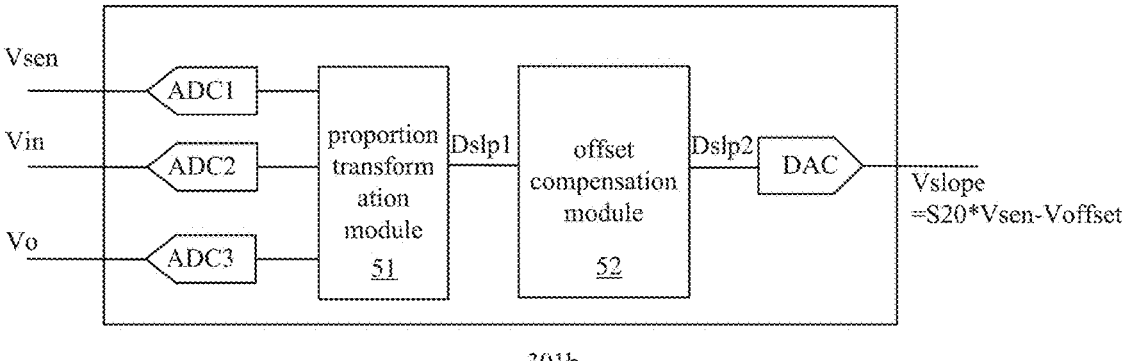
Figure 10:
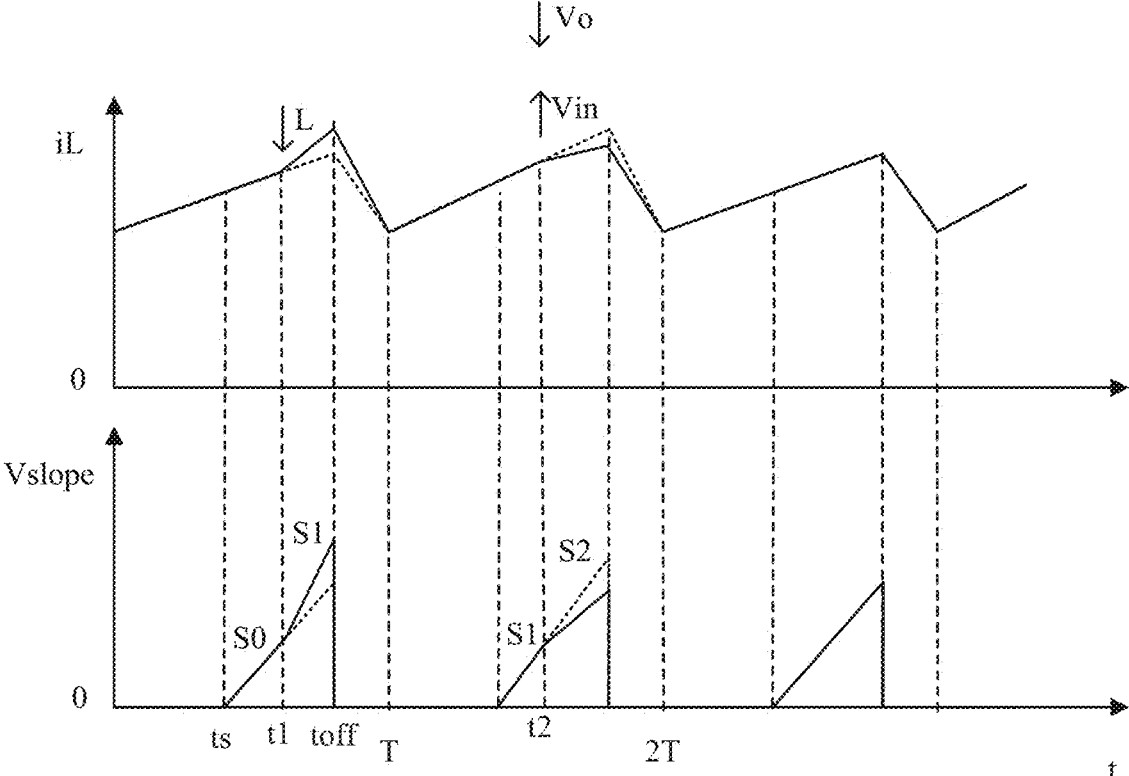
Figure 11:
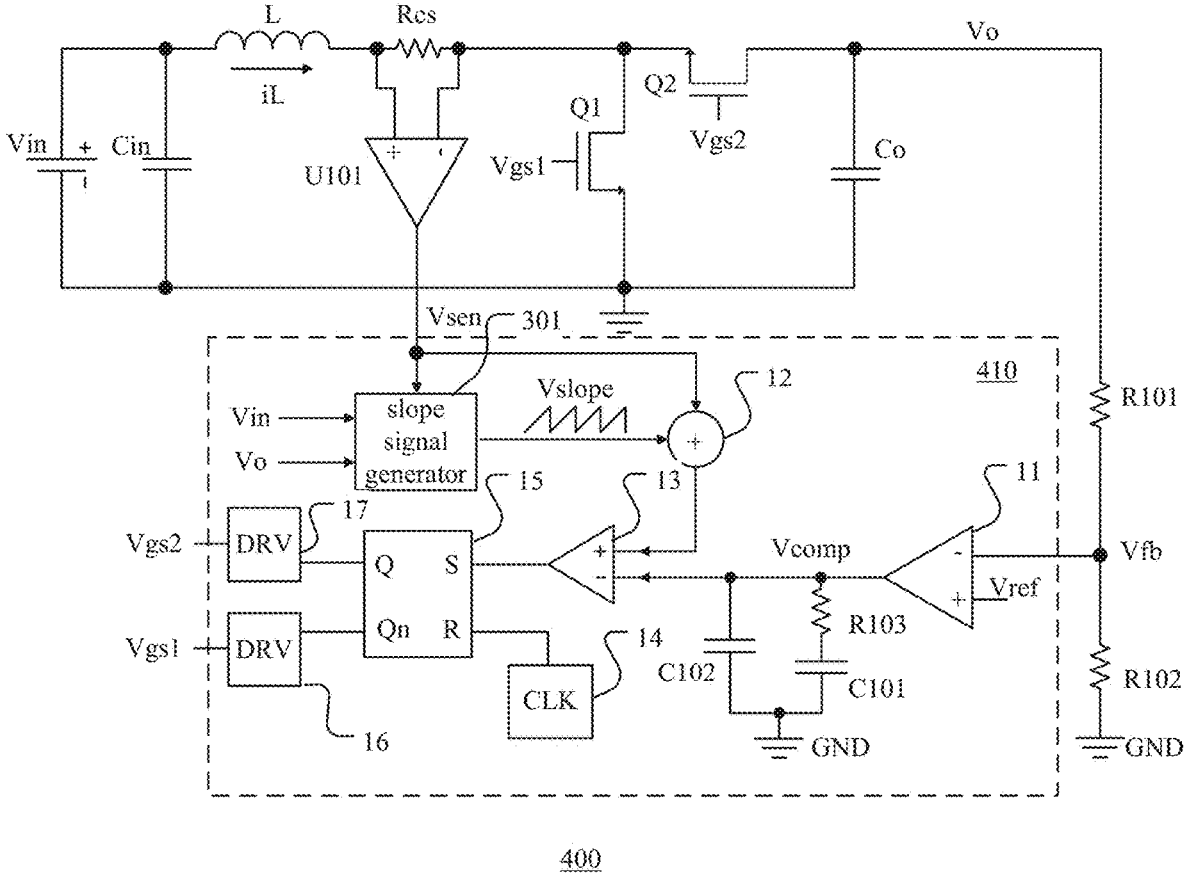
Figure 12:
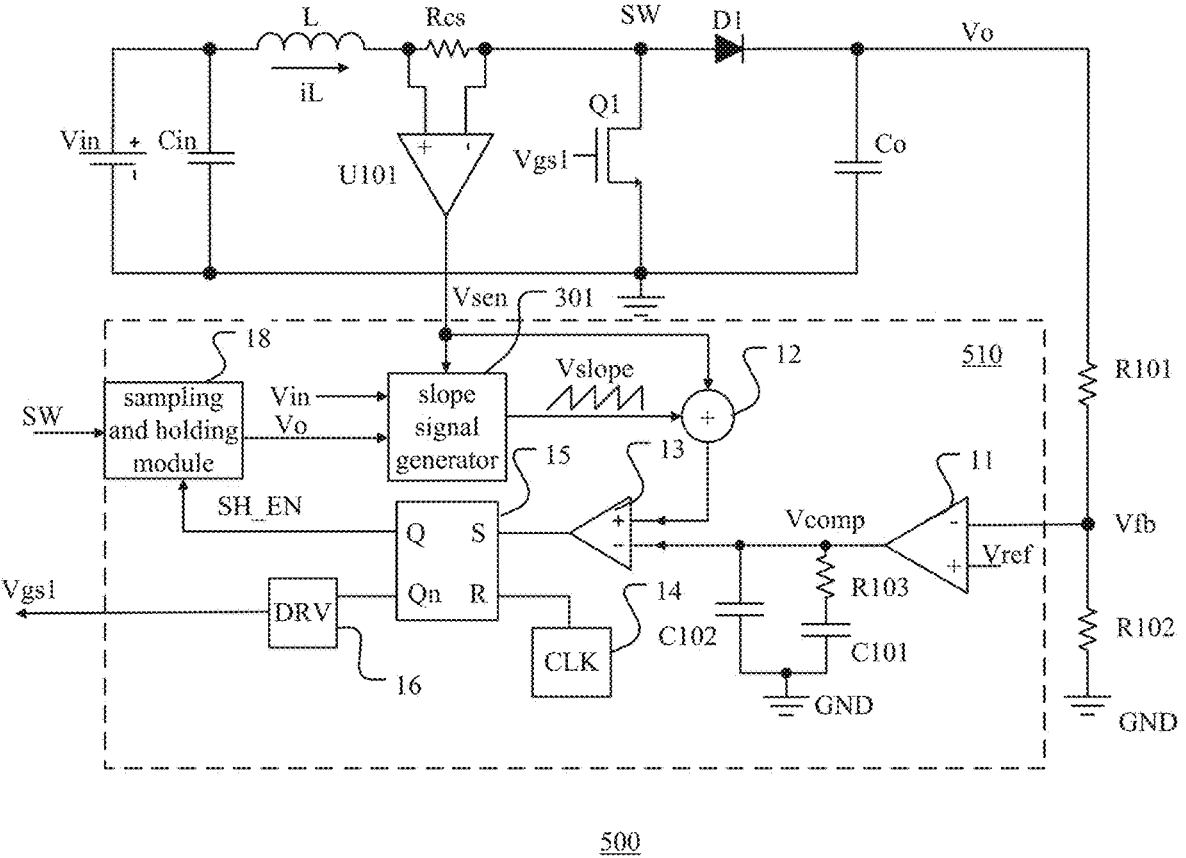

FIG. 5 shows a working waveform of the slope signal generator shown in FIG. 3 under stable working state;

FIG. 6 shows a working waveform of the slope signal generator shown in FIG. 3 under fluctuation state;

FIG. 7 shows a schematic circuit diagram of the power converter according to the second embodiment of the present disclosure;

FIG. 8 shows a schematic circuit diagram of the first embodiment of the slope signal generation in the power converter shown in FIG. 7;

FIG. 9 shows a schematic block diagram of the second embodiment of the slope signal generation in the power converter shown in FIG. 7;

FIG. 10 shows a working waveform of the slope signal generator shown in FIG. 8 in the fluctuation state;

FIG. 11 shows a schematic circuit diagram of the power converter according to the third embodiment of the present disclosure;

FIG. 12 shows a schematic diagram of the power converter according to the fourth embodiment of the present disclosure.

DETAILED DESCRIPTION

The following will describe the preferred embodiments of the present disclosure in great details by combining with the accompanying drawings. However, the present invention is not restricted to these embodiments. The present disclosure convers any replacement, modifications, equivalent methods, and solutions made within the sprits and scope of the present disclosure.

In order to make the public have a thorough understanding, specific details are described in the following preferred embodiments of the present disclosure; however, those skilled in the art can totally understand the present disclosure without these detailed descriptions.

The present disclosure is described in great details in the following paragraphs by referring to the accompanying drawings. It should be noted that the accompanying drawings all use simplified forms and use non-accurate sales, just for the purpose of conveniently and clearly illustrate the embodiments of the present disclosure.

Figure 1:
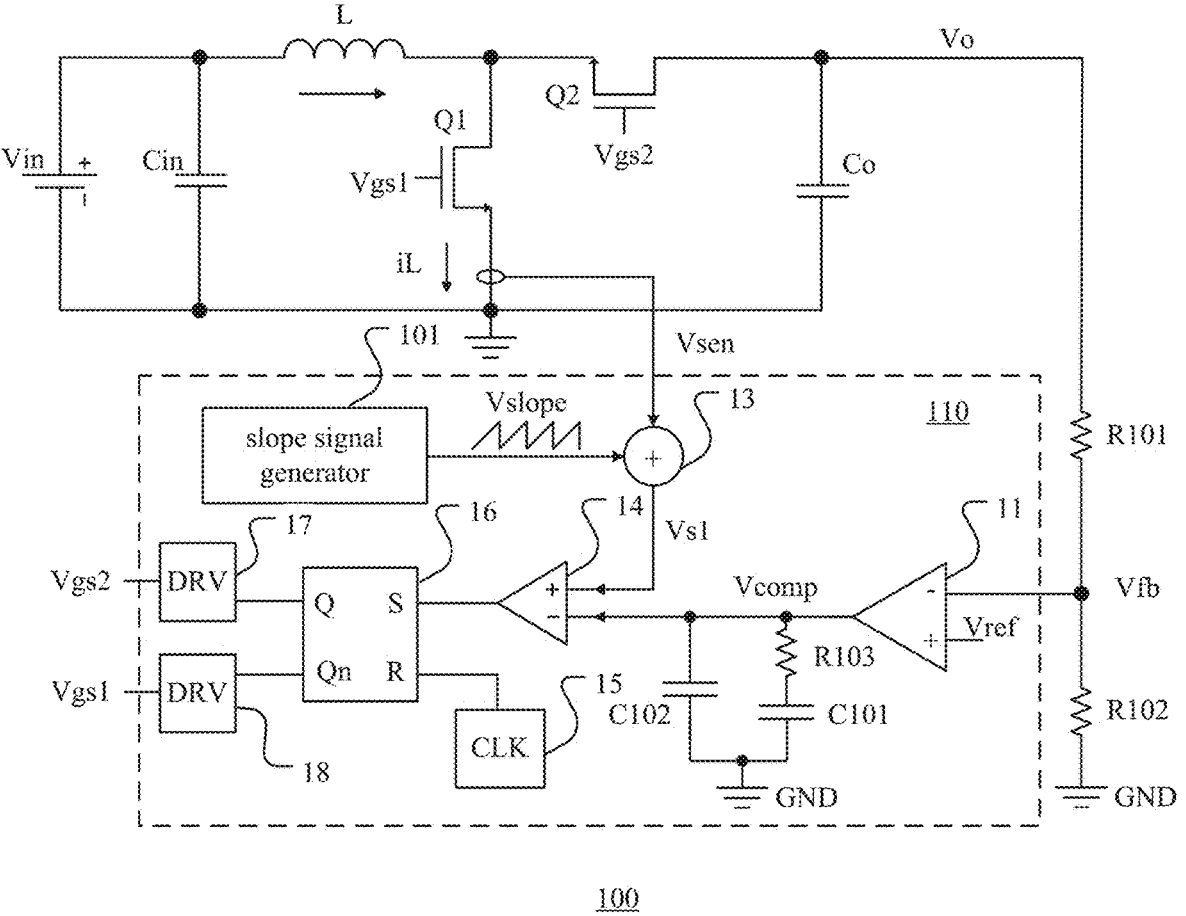
FIG. 1 shows a schematic circuit diagram of the power converter according to the prior art.
Figure 2:
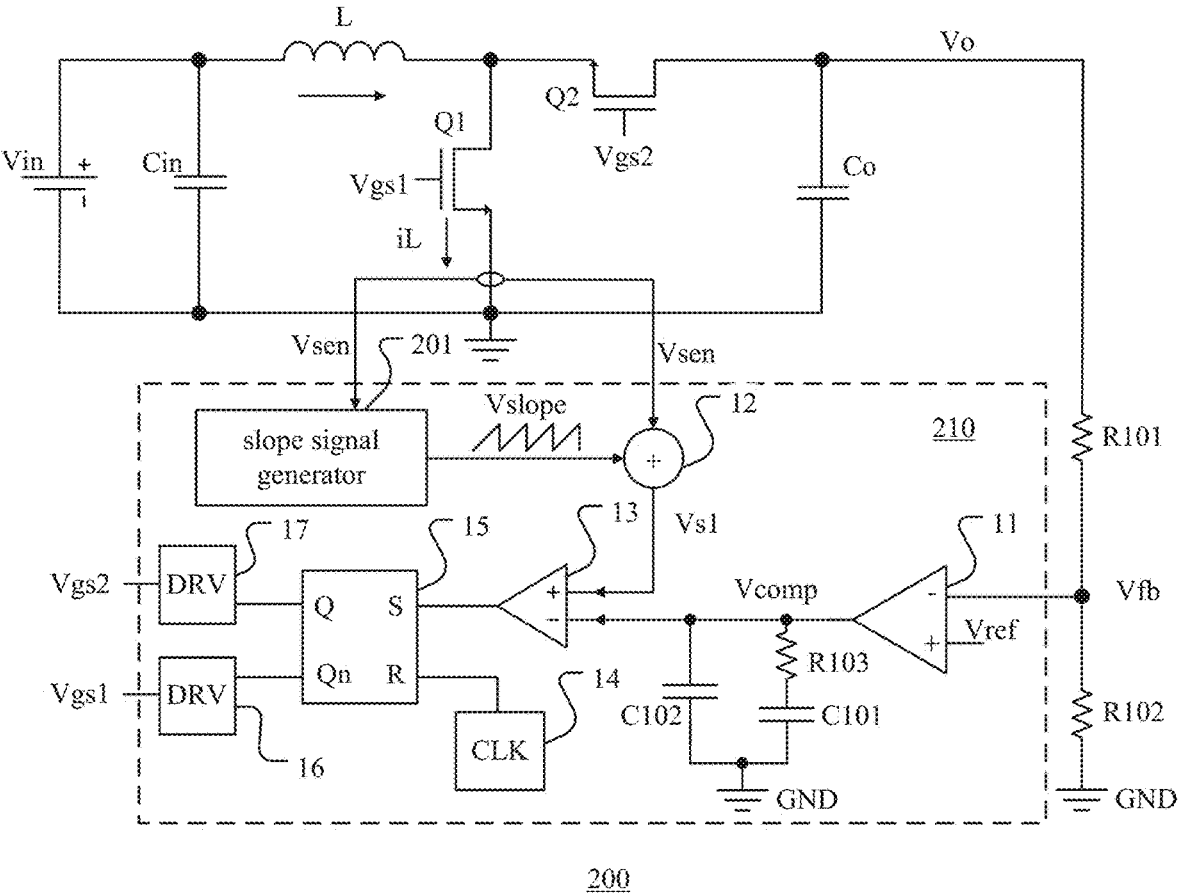
FIG. 2 shows a schematic circuit diagram of the power converter according to the first embodiment of the present disclosure.

FIG. 2 shows a schematic circuit diagram of the power converter according to the first embodiment of the present invention. The power converter 200 comprises, e.g., switch transistors Q1 and Q2, inductor L, and control circuit 210.

Power converter 200 uses the BOOST topology, wherein the inductor L and switch transistor Q1 are connected in series between the input terminal and the grounding terminal, while the switch transistor Q2 is connected between the intermediate node of inductor L and the switch transistor Q1 and the output terminal. The input capacitor Ci is connected between the input terminal and the grounding terminal, while the output capacitor Co is connected between the output terminal and the grounding terminal, for obtaining the smooth waveforms of the input voltage Vin and the output voltage Vo.

Furthermore, the power converter 200 further comprises resistors R101 and R102 connected in series between the output terminal and the ground. The voltage feedback signal Vfb of the output voltage Vo is obtained at the intermediate node of resistors R101 and R102. The power converter 200 further comprises a current sense device (e.g., a sampling resistor) connected between the switch transistor Q1 and the ground, for obtaining the current sense signal Vsen of the inductor current iL when the switch transistor Q1 is turned on.

The control circuit 210 comprises a slope signal generator 201, an error amplifier 11, a superimposing module 12, a comparator 13, a resistor R103, and capacitors C101 and C102. The in-phase input terminal and the inverse input terminal of error amplifier 11 receive a reference voltage Vref and a voltage feedback signal Vfb respectively. The error amplifier 11, e.g., a transconductance amplifier, is for converting the differential voltage between the voltage feedback signal Vfb and the reference voltage Vref into output current. The resistor R103 and capacitor C101 are connected in series between the output terminal of error amplifier 11 and the ground. The output current generated by error amplifier 11 is charged to capacitor C101 through resistor R103, thereby converting the output current generated by error amplifier 11 into a compensation signal Vcomp. Capacitor C102 is connected between the output terminal of error amplifier 11 and ground to obtain a smooth voltage waveform of the compensation signal Vcomp. The slope signal generator 201 is used to generate a slope signal Vslope. The superimposing module 12 superimposes the current sense signal Vsen of the inductor current iL with the slope signal to generate the superimposed signal Vs1. The in-phase input terminal and the inverse input terminal of comparator 13 receive the superimposed signal Vs1 and the compensation signal Vcomp respectively, and compare the two to generate a set signal.

Furthermore, the control circuit 210 further comprises an RS trigger 15, a clock module 14, and drive modules 16 and 17. As mentioned above, the control circuit 210 generates a set signal for the RS trigger 15 based on the voltage feedback signal Vfb and the current sense signal Vsen. The clock module 14 is for generating the clock signal CLK as a reset signal for RS trigger 15. The RS trigger 11 generates logic signals with opposite phases to each other according to the set signal and reset signal, which are amplified and buffered by drive modules 16 and 17, and then obtains the switch control signals Vgs1 and Vgs2.

When switch transistor Q1 is turned on, switch transistor Q2 is turned off. The input terminal of the power converter 200 receives the input voltage Vin and charges the inductor L. The inductor current iL flows through the inductor L and switch transistor Q1 sequentially. When switch transistor Q1 is turned off, switch transistor Q2 is turned on. The inductor L discharges the output terminal through the switch transistor Q2, thus generating an output voltage Vo. During the continuous switching cycles, the output capacitor Co filters the output voltage Vo to obtain a smooth voltage waveform.

In the power converter according to this embodiment, the current sense signal Vsen is superimposed with the slope signal Vslope to generate a superimposed signal Vs1. The slope signal Vslope is used to compensate for the slope of the current sense signal Vsen, so that the slope of the superimposed signal Vs1 increases relative to the slope of the current sense signal Vsen, which can reduce the occurrence of subharmonic oscillations and expand the duty cycle range of the switch control signal.

Based on the theoretical analysis of power converters, it can be concluded that for the power converters with BOOST topology, the subharmonic oscillation of the power converter can be eliminated when the following equation (1) is satisfied.

$$\frac{dVslope}{dt} > \frac{Vo - 2*\text{Vin}}{2L}*Rcs = \left(\frac{1}{2}*\frac{Vo}{\text{Vin}} - 1\right)*\frac{dVsen}{dt} \qquad (1)$$

8

Wherein, Vin and Vo represent the input voltage and output voltage of the power converter respectively; Vsen represents the current sense signal of the inductor, L represents the inductance value of the inductor in the power converter, and Rcs represents the sampling resistance value of the inductance current.

Based on the theoretical analysis of the power converter, it can be concluded that for the power converter with BUCK topology, the subharmonic oscillation of the power converter can be eliminated when the following equation (2) is satisfied.

$$\frac{dVslope}{dt} > \frac{2*Vo - \text{Vin}}{2L}*Rcs = \frac{1}{2}*\left(\frac{Vo}{\text{Vin} - Vo} - 1\right)*\frac{dVsen}{dt} \qquad (2)$$

Wherein, Vin and Vo represent the input voltage and output voltage of the power converter respectively; Vsen represents the current sense signal of the inductor, L represents the inductance value of the inductor in the power converter, and Rcs represents the sampling resistance value of the inductance current.

The above formulas (1) and (2) are uniformly denoted as follows:

$$\frac{dVslope}{dt} > \frac{1}{2}*(a-1)*\frac{dVsen}{dt} \qquad (3)$$

Wherein, Vsen represents the current sense signal of the inductor, a represents the parameters related to input voltage and output voltage. For power converters using BOOST topology, a=(Vo−Vin)/Vin, and for power converters using BUCK topology, a=Vo/(Vin−Vo).

By integrating the above equation (3), the following equation can be obtained:

$$\text{Vslope} > \frac{1}{2}*(a-1)*Vsen - \text{Voffset} \qquad (4)$$

Wherein, Vsen represents the current sense signal of the inductor, Voffset represents the offset compensation signal corresponding to the current valley of the inductor, and a represents the parameters related to input voltage and output voltage. For power converters using BOOST topology, a=(Vo−Vin)/Vin, and for power converters using BUCK topology, a=Vo/(Vin−Vo).

In the power converter according to this embodiment, the slope signal generator 201 can adopt an analog circuit scheme or a digital circuit scheme. As described below, the slope signal generator 201 comprises a proportion transformation module and an offset compensation module, wherein the proportion transformation module receives the current sense signal of the inductor, performs proportion transformation on the current sense signal of the inductor based on the rated input voltage and output voltage to obtain a replicated signal, and the offset compensation module performs offset compensation on the replicated signal to obtain a slope signal. In this embodiment, the slope signal generator 201 uses the proportion transformation module to copy the current sense signal into a slope signal, and sets the circuit parameters of the proportion transformation module to conform to above equation (4). Therefore, the slope change of the slope signal characterizes the change in inductance value of the inductor. The slope signal generator

201 of the power converter can adaptively adjust the slope of the slope signal during the switching cycle and dynamically compensate for the fluctuation of inductance value.

FIG. 3 shows a schematic circuit diagram of the first embodiment of the slope signal generator in the power converter shown in FIG. 2. In this embodiment, the slope signal generator 201a adopts an analog circuit scheme and performs offset compensation based on the sampling signal of the replicated signal Vslp.

Refer to FIG. 3, the slope signal generator 201a comprises a proportion transformation module 21 and an offset compensation module 22.

The proportion transformation module 21 comprises an operational amplifier U1 and resistors R11 to R14. Resistors R11 and R12 are connected in series between the input terminal of the proportion transformation module 21 and the ground. The in-phase input terminal of operational amplifier U1 is connected to the intermediate node of resistors R11 and R12, and the inverted input terminal is grounded through resistor R13. Resistance R14 is connected between the inverted input and output terminals of operational amplifier U1.

Therefore, the proportion transformation module 21 performs proportion transformation on the current sense signal Vsen of the inductor to obtain the replicated signal Vslp, and the replicated signal Vslp provided at the output terminal of the proportion transformation module 21 is as shown in the following equation:

$$Vslp = \left(1 + \frac{R14}{R13}\right) * \frac{R12}{R11 + R12} * Vsen = S1 * Vsen \qquad (5)$$

Wherein, S1 represents the proportion coefficient of the proportion transformation module, and R11 to R14 represent the resistance values in the proportion transformation module, respectively.

The offset compensation module 22 comprises a sampling and holding module 221 and a subtraction module 222.

The sampling and holding module 221 comprises an operational amplifier U2, a first switch S1, and a sampling capacitor C11. The first switch S1 is connected in series with the sampling capacitor C11 between the input terminal of the sampling and holding module 221 and the ground. When the first switch S1 is turned on, the sampling capacitor C11 samples the replicated signal Vslp. The in-phase input terminal of operational amplifier U2 is connected to the high potential terminal of capacitor C11, and the inverted input terminal is connected to the output terminal to form a voltage follower to provide a sampling signal. The sampling and holding stages of the sampling and holding module 221 correspond to the on and off stages of the first switch S1 respectively.

The subtraction module 222 comprises an operational amplifier U3, a second switch S2, and resistors R15 to R18. Resistors R15 and R16 are connected in series between the input terminal of subtraction module 222 and the ground. The in-phase input of operational amplifier U3 is connected to the intermediate node of resistors R15 and R16 to receive the replicated signal Vslp, while the inverted input terminal is connected to the output terminal of the sampling and holding module 221 via resistor R17 to receive the sampling signal. Furthermore, resistor R18 is connected between the inverting input and output terminals of operational amplifier U3. The second switch S2 is connected between the output terminal of the operational amplifier U3 and the output terminal of the subtraction module 222, and synchronously switches the connection status of the output terminal of operational amplifier U3 with the first switch S1. In the sampling stage of the sampling and holding module 221, the second switch S2 connects the output terminal of the operational amplifier U3 to the ground provide a low-level signal. In the holding stage of the sampling and holding module 221, the second switch S2 connects the output terminal of the operational amplifier U3 to the output terminal of the operational amplifier U3 to obtain the differential signal between the replicated signal Vslp and the sampling signal.

In the continuous conduction mode (CCM) of the power converter, the current value of inductor L is at a valley and greater than 0 at the beginning of the switching cycle. In the discontinuous conduction mode (DCM) of the power converter, the current value of inductor L is in a valley and equal to 0 at the start time of the switching cycle.

In this embodiment, during the sampling stage of the sampling and holding module 221, the sampling time ts of the sampling signal is, for example, the end time of the sampling stage. The sampling time ts can be any time between the start time of the switching cycle T of the power converter and the half-cycle time. The subtraction module 222 of the offset compensation module 22 performs subtraction operations based on the sampling signal, thereby subtracting the offset compensation signal Voffset corresponding to the sampling signal from the current sense signal Vsen. If sampling occurs at the start time of the switching cycle, the offset compensation signal Voffset corresponds to the current valley value of inductor L. If sampling occurs between the start time of the switching cycle and the half-cycle time, the offset compensation signal Voffset is greater than the current valley of the inductor L.

Therefore, the offset compensation module 22 performs offset compensation on the replicated signal Vslp corresponding to the current sense signal Vsen. Regardless of the continuous conduction mode (CCM) or intermittent conduction mode (DCM) of the power converter, a slope signal Vslope starting from 0 can always be obtained. The slope signal Vslope provided at the output end of the offset compensation module 22 is as follows:

$$Vslope = \qquad (6)$$
$$\left(1 + \frac{R18}{R17}\right) * \frac{R16}{R15 + R16} * (Vslp - Vsample) = S2 * Vspl - Voffset$$

Wherein, Vslp represents the replicated signal of the current sense signal, Vsample represents the sampling signal corresponding to the current valley of the inductor, Voffset represents the offset compensation signal corresponding to the current valley of the inductor, S2 represents the proportion coefficient of the offset compensation module, and R15 to R18 represent the resistance values in the offset compensation module respectively.

By combining the above formulas (5) and (6), the slope signal Vslope can be denoted as follows:

$$Vslope = k * (a - 1) * Vsen - Voffset \qquad (7)$$

Wherein, Vsen represents the current sense signal of the inductor, Voffset represents the offset compensation signal corresponding to the current valley of the inductor, a represents the first circuit parameter of the slope signal gen-
erator, and k represents the second circuit parameter of the
slope signal generator.

In the above formula (7), by selecting the device param-
eters of the active and/or passive components in the slope
signal generator, the first circuit parameter a of the slope
signal generator can be set to make the first circuit parameter
a correspond to the rated input voltage Vin and output
voltage Vo. For power converters using BOOST topology,
a=Vo/(Vin−Vo), and for power converters using BUCK
topology, a=Vo/(Vin−Vo); for example, a subtraction mod-
ule is used to obtain Vin−Vo. In this embodiment, the first
circuit parameters of the slope signal generator comprise the
rated input voltage Vin and the rated output voltage Vo.

In the above formula (7), by selecting the device param-
eters of the active and/or passive components in the slope
signal generator, the second circuit parameter k of the slope
signal generator can be set so that the second circuit param-
eter k is greater than ½.

Therefore, according to the slope signal generator of this
embodiment, the device parameters of the active and/or
passive devices in the slope signal generator are selected so
that the first circuit parameter a of the slope signal generator
corresponds to the rated input voltage Vin and output voltage
Vo, and the second circuit parameter k of the slope signal
generator is greater than ½, i.e., it can always conform to the
above equation (4). Regardless of whether the inductance
value of the inductor in the power converter changes with
the design specifications of the power converter, or fluctu-
ates with temperature and load conditions, or changes with
long-term working aging, the slope signal generator always
meets the subharmonic suppression conditions.

Figure 4:
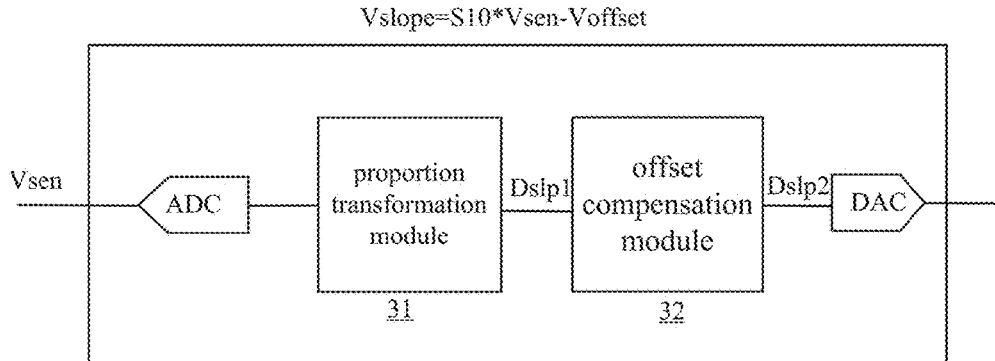
FIG. 4 shows a schematic circuit diagram of the second embodiment of the slope signal generator in the power converter shown in FIG. 2.

FIG. 4 shows a schematic block diagram of a second
embodiment of a slope signal generator in the power con-
verter shown in FIG. 2. In this embodiment, the slope signal
generator 201b adopts a digital circuit scheme and performs
offset compensation based on the sampling signal of the
replicated signal Vslp.

See FIG. 4, the slope signal generator 201b comprises an
analog-to-digital converter ADC, a digital-to-analog con-
verter DAC, a proportion transformation module 31, and an
offset compensation module 32. The proportion transforma-
tion module 31 and the offset compensation module 32 can
be any numerical calculation module. For example, the
proportion transformation module 31 and the offset com-
pensation module 32 can be implemented using internal
modules or programs of the processor.

The analog-to-digital converter ADC converts the analog
value of the current sense signal Vsen into a digital value.
The proportion transformation module 31 performs numeri-
cal calculations on the digital value of the current sense
signal Vsen to obtain the digital value Dslp1 of the repli-
cated signal corresponding to the current sense signal Vsen.
The offset compensation module 32 samples the digital
value Dslp1 of the replicated signal at the predetermined
sampling time ts to obtain the sampling value. This sampling
value represents the offset compensation signal correspond-
ing to the current valley of inductance L. Then, the offset
compensation module 32 subtracts the sampling value from
the digital value Dslp1 of the replicated signal to obtain the
digital value Dslp2 of the slope signal. Furthermore, the
digital-to-analog converter DAC converts the digital value
Dslp2 of the slope signal into a slope signal.

Therefore, the slope signal Vslope provided at the output
end of the slope signal generator 201b is as follows:

$$\text{Vslope} = S10 * Vsen - \text{Voffset} \qquad (8)$$

Wherein, Vsen represents the current sense signal of the
inductor, Voffset represents the offset compensation signal
corresponding to the current valley of the inductor, and S10
represents the proportion coefficient of the proportion trans-
formation module.

Therefore, the slope signal generator according to the
embodiment selects the proportion coefficient of the propor-
tion transformation module in the slope signal generator,
such that the first circuit parameter a of the slope signal
generation corresponds to the rated input voltage Vin and the
output voltage Vo; moreover, the second circuit parameter k
of the slope signal generator is greater than ½, which means
that it can always conform to above equation (4). Regardless
of whether the inductance value of the inductor in the power
converter changes with the design specifications of the
power converter, or fluctuates with temperature and load
conditions, or changes with long-term working aging, the
slope signal generator always meets the subharmonic sup-
pression conditions.

FIG. 5 shows the working waveform of the slope signal
generator shown in FIG. 3 in a stable state. The switch
transistor Q1 of the power converter 200 is turned on and off
alternatively during the continuous switching cycles of the
switch transistor Q1.

During the continuous switching cycles, the inductance L
of the power converter 200 undergoes repeated charging and
discharging processes. During the charging phase, the induc-
tance current iL of inductor L increases, and the current
detection signal Vsen of inductance current iL is propor-
tional to the inductance current iL. During the discharge
phase, the inductance current iL of inductor L decreases, and
the current sense signal Vsen of inductance current iL is 0.

The replicated signal Vslp generated by the proportion
transformation module 21 in the slope signal generator 201
is a replicated signal of the current sense signal Vsen. The
waveform of the replicated signal Vslp is roughly the same
as that of the current sense signal Vsen, but the amplitude of
the replicated signal Vslp is directly proportional to the
amplitude of the current sense signal Vsen.

The offset compensation module 22 in the slope signal
generator 201 obtains the sampling signal of the replicated
signal Vslp at the sampling time ts in the switching period
T, and subtracts the offset compensation signal Voffset
corresponding to the sampling signal from the replicated
signal Vslp to obtain the slope signal Vslope.

The sampling time ts of the sampling signal can be any
time between the start time of the switching cycle T of the
power converter and the half-cycle time. The subtraction
module 222 of the offset compensation module 22 performs
subtraction operations based on the sampling signal, thereby
subtracting the offset compensation signal Voffset corre-
sponding to the sampling signal from the current sense
signal Vsen. If sampling occurs at the beginning of the
switching cycle, the offset compensation signal Voffset
corresponds to the current valley value of inductor L. If
sampling occurs between the start time of the switching
cycle and the half-cycle time, the offset compensation signal
Voffset is greater than the current valley value of the
inductor L.

Therefore, the slope signal Vslope generated by the slope
signal generator 201 is a replicated signal of the inductance
current sense signal Vsen that starts at the sampling time ts
of the switching cycle T.

FIG. 6 shows the working waveform of the slope signal generator shown in FIG. 3 in a fluctuating state. The switch transistor Q1 of the power converter 200 is alternatively turned on and off during continuous switching cycles of the switch transistor Q1.

See FIG. 6, during continuous switching cycles, the slope of the slope signal Vslope generated by the slope signal generator 201a in the power converter 200 is always inversely proportional to the inductance value of inductance L.

During the first switching cycle from time 0 to time T, the initial slope of the slope signal Vslope is S0. At time t1, the inductance value of inductance L decreases due to changes in ambient temperature or load conditions, then the slope signal generator 201 increases the slope of the slope signal Vslope to S1 during the time period from time t1 to time T. During the second switching cycle from time T to time 2T, the initial slope of the slope signal Vslope is S1. At time t2, if the inductance value of inductor L increases due to changes in ambient temperature or load conditions, the slope signal generator 201 reduces the slope of the slope signal Vslope to S2 during the time period from time t2 to time 2T.

Therefore, the slope signal generator can adaptively adjust the slope of the slope signal during the switching cycle, to compensate for the fluctuation of inductance value, quickly and dynamically improve the suppression of subharmonic oscillation, and thus enhance the stability of the power converter under different temperature and load conditions.

The slope signal generation circuit uses the selection of circuit parameters to adaptively adjust the slope of the slope signal during the switching cycle. Due to the fact that the slope signal generator always meets the subharmonic suppression conditions, there is no need to design different circuit structures for power converters of different specifications (e.g., different inductance values). Therefore, the slope signal generator can simplify the circuit structure and significantly reduce circuit design costs.

FIG. 7 shows a schematic circuit diagram of a power converter according to a second embodiment of the present invention. The power converter 300 comprises, for example, switch transistors Q1 and Q2, inductor L, and control circuit 310.

The power converter 300 adopts a BOOST topology, where the inductor L and switch transistor Q1 are connected in series between the input terminal and the grounding terminal, and the switch transistor Q2 is connected between the intermediate node of inductor L and switch transistor Q1 and the output terminal. The input capacitor Ci is connected between the input and ground terminals, and the output capacitor Co is connected between the output and ground terminals to obtain a smooth waveform of the input voltage Vin and output voltage Vo.

Further, the power converter 300 further comprises resistors R101 and R102 connected in series between the output terminal and the ground. The voltage feedback signal Vfb of the output voltage Vo is obtained at the intermediate node of resistors R101 and R102. The power converter 300 further comprises a current sense device (such as a sampling resistor) connected between the switching transistor Q1 and the ground, for obtaining the current sense signal Vsen of the inductor current iL when the switch transistor Q1 is turned on.

The control circuit comprises a slope signal generator 301, an error amplifier 11, a superimposing module 12, a comparator 13, a resistor R103, and capacitors C101 and C102. The in-phase input terminal and the inverse input terminal of error amplifier 11 receive voltage feedback signals Vfb and reference voltage Vref respectively. Error amplifier 11, such as a transconductance amplifier, is used to convert the differential voltage of the voltage feedback signal Vfb and the reference voltage Vref into the output current. The resistor R103 and capacitor C101 are connected in series between the output terminal of error amplifier 11 and the ground. The output current generated by error amplifier 11 is charged to capacitor C101 through resistor R103, thereby converting the output current generated by error amplifier 11 into a compensation signal Vcomp. Capacitor C102 is connected between the output terminal of error amplifier 11 and the ground to obtain a smooth voltage waveform of the compensation signal Vcomp. The slope signal generator 301 is used to generate a slope signal Vslope. The superimposing module 12 superimposes the current sense signal Vsen of the inductor current iL with the slope signal to generate the superimposed signal Vs1. The in-phase input terminal and the inverse input terminal of comparator 13 respectively receive the superimposed signal Vs1 and the compensation signal Vcomp, and compare the two to generate a set signal.

Furthermore, the control circuit 310 further comprises an RS trigger 15, a clock module 14, and drive modules 16 and 17. As mentioned above, the control circuit 310 generates a set signal for the RS trigger 15 based on the voltage feedback signal Vbf and the current sense signal Vsen. The clock module 14 is used to generate clock signal CLK as a reset signal for RS trigger 15. RS trigger 11 generates logic signals that are opposite to each other based on the set signal and reset signal, which are amplified and buffered by drive modules 16 and 17, and then obtain switch control signals Vgs1 and Vgs2.

When switch transistor Q1 is turned on, switch transistor Q2 is turned off. The input terminal of the power converter 300 receives the input voltage Vin and charges the inductor L. The inductor current iL flows through inductor L and switch transistor Q1 in sequence. When switch Q1 is turned off, switch Q2 is turned on. The inductor L discharges to the output terminal through the switch transistor Q2, thus generating an output voltage Vo. During continuous switching cycles, the output capacitor Co filters the output voltage Vo to obtain a smooth voltage waveform.

According to the power converter of this embodiment, the current sense signal Vsen is superimposed with the slope signal Vslope to generate a superimposed signal Vs1. The slope signal Vslope is used to compensate for the slope of the current sense signal Vsen, so that the slope of the superimposed signal Vs1 increases relative to the slope of the current sense signal Vsen, which can reduce the occurrence of subharmonic oscillations and expand the duty cycle range of the switch control signal.

In the power converter according to this embodiment, the slope signal generator 301 can adopt an analog circuit scheme or a digital circuit scheme. As described below, the slope signal generator 301 comprises a proportion transformation module and an offset compensation module, wherein the proportion transformation module receives the current sense signal of the inductor, as well input voltage and output voltage collected in real time, to perform proportion transformation on the current sense signal of the inductor to obtain a replicated signal, and the offset compensation module performs offset compensation on the replicated signal to obtain a slope signal. In this embodiment, the slope signal generator 301 uses the proportion transformation module to copy the current sense signal into a slope signal, and sets the circuit parameters of the proportion transformation module to conform to the above equation (4). Therefore, the slope change of the slope signal characterizes the change in inductance value of the inductor. The slope signal generator 301 of this power converter can adaptively adjust the slope of the slope signal during the switching cycle and dynamically compensate for the fluctuation of inductance value.

FIG. 8 shows a schematic circuit diagram of the first embodiment of the proportion transformation module in the slope signal generator shown in FIG. 7. In this embodiment, the slope signal generator 301*a* adopts an analog circuit scheme and performs offset compensation based on the sampling signal of the replicated signal Vslp.

Refer to FIG. 8, the slope signal generator 301*a* comprises a proportion transformation module 41 and an offset compensation module 22. The offset compensation module 22 is the same as the offset compensation module 22 in the slope signal generator 201*a* shown in FIG. 3, which is omitted here.

The proportion transformation module 41 comprises a multiplication module 411, a division module 412, and an adder module 413.

The multiplication module 411 comprises a multiplier U4, resistors R21, and R22. Resistors R21 and R22 are connected in series between the output terminal of multiplication module 411 and the ground. The first input of multiplier U4 receives the current sense signal Vsen, and the second input is connected to the intermediate node of resistors R1 and R2 to receive the output voltage Vo.

The intermediate signal V11 provided by the output terminal of multiplier U4 is as follows:

$$V11 = \frac{K11*R22}{R21+R22}*Vsen*Vo = S11*Vsen*Vo \quad (9)$$

Wherein, S11 represents the proportion coefficient of the multiplication module, K11 represents the proportion coefficient of the multiplier in the multiplication module, R21 and R22 represent the resistance values of the resistors in the multiplication module, respectively.

The division module 412 comprises a multiplier U5, an operational amplifier U6, and resistors R23 to R27. The resistor R23 is connected to the in-phase input terminal of the operational amplifier U6, and the resistor R25 is connected between the inverted input terminal of the operational amplifier U6 and ground. Resistors R26 and R27 are connected in series between the input voltage Vin and the ground, with their intermediate node connected to the first input terminal of multiplier U5. The second input terminal of multiplier U5 is connected to the output of operational amplifier U6, and the output terminal of multiplier U5 is connected to the in-phase input of operational amplifier U6 through resistor R24. Therefore, the multiplier U5, operational amplifier U6, and resistors R23 to R27 in the slope signal generator 301*a* are connected as a division circuit. The intermediate signal V11 is supplied to the in-phase input of operational amplifier U6 through resistor R23, and the input voltage Vin is supplied to the first input of multiplier U5 through resistors R26 and R27.

The intermediate signal V12 provided by the output terminal of operational amplifier U6 is as shown in the following equation:

$$V12 = -\frac{R24}{K12*R23}*\frac{(R26+R27)}{R27}*\frac{V11}{Vin} = -S12*\frac{V11}{Vin} \quad (10)$$

16

Wherein, S12 represents the proportion coefficient of the division module, K12 represents the proportion coefficient of the multiplier in the division module, and R23 and R24, as well as R26 and R27, represent the resistance values of the resistors in the division module respectively.

The adder module 413 comprises operational amplifiers U7 to U9 and resistors R28 to R32. Resistance R28 is connected between the inverting input of operational amplifier U7 and ground, while resistance R29 is connected between the output terminal and the inverting input terminal of the operational amplifier U7. The in-phase input terminal of operational amplifier U7 receives a current sense signal Vsen. Therefore, the operational amplifier U7 is connected to resistors R28 and R29 to form an in-phase amplification circuit. The inverting input terminal of operational amplifier U8 is connected to the output terminal of division module 412 through resistor R30, and to the output terminal of the operational amplifier U7 through resistor R31. Furthermore, resistor R32 is connected between the output terminal of the operational amplifier U8 and the inverting input terminal. Therefore, the operational amplifier U8 is connected to resistors R30 to R32 to form a reverse amplification circuit. Furthermore, the output terminal of the operational amplifier U9 is connected to the inverting input terminal, forming a voltage follower. The intermediate signal V12 is supplied to the inverting input of the operational amplifier U8 through resistor R30, and the proportion signal of the current sense signal Vsen is supplied to the inverting input of the operational amplifier U8 through resistor R31.

The output terminal of the operational amplifier U9 provides a replicated signal Vslp of the current sense signal as shown in the following equation:

$$Vslp = -\left(\frac{R32}{R30}*\frac{R28+R29}{R28}*Vsen + \frac{R32}{R30}*V12\right) \quad (11)$$

Wherein, R28 to R32 denote the multiple resistance values in the adder module respectively.

By combining the above equations (9) to (11), the slope signal Vslope can be expressed as follows:

$$Vslope = k*(a-1)*Vsen - Voffset \quad (12)$$

Wherein Vsen represents the current sense signal of the inductor, Voffset represents the offset compensation signal corresponding to the current valley of the inductor, a represents the first circuit parameter of the slope signal generator, and k represents the second circuit parameter of the slope signal generator.

In the above equation (12), by selecting the device parameters of the active and/or passive components in the slope signal generator, the first circuit parameter a of the slope signal generator can be set to correspond to the input voltage Vin and output voltage Vo collected in real time. For power converters using BOOST topology, a=(Vo−Vin)/Vin, and for power converters using BUCK topology, a=Vo/(Vin−Vo), for example, Vin−Vo is obtained using an adder module. In this embodiment, the first circuit parameters of the slope signal generator comprise the rated input voltage Vin and the rated output voltage Vo.

In the above equation (12), by selecting the device parameters of the active and/or passive components in the slope signal generator, the second circuit parameter k of the slope signal generator can be set so that the second circuit parameter k is greater than ½.

Therefore, the slope signal generator according to this embodiment selects the device parameters of the active and/or passive components in the slope signal generator, so that the first circuit parameter a of the slope signal generator corresponds to the input voltage Vin and output voltage Vo collected in real time, and the second circuit parameter k of the slope signal generator is greater than ½, which can always conform to the above equation (4).

Therefore, the power converter in the slope signal generator according to the second embodiment can dynamically compensate for the input voltage, the output voltage, and the inductance values, and select the device parameters of the active and/or passive devices in the slope signal generator so that the slope signal generator always meets the subharmonic suppression conditions.

FIG. 9 shows a schematic block diagram of a second embodiment of the slope signal generator in the power converter shown in FIG. 7. In this example, the slope signal generator 301*b* adopts a digital circuit scheme and performs offset compensation based on the sampling signal of the replicated signal Vslp.

See FIG. 9, the slope signal generator 301*b* comprises analog-to-digital converters ADC1 to ADC3, an analog-to-digital converter DAC, a proportion transformation module 51, and an offset compensation module 512.

The proportion transformation module 51 and the offset compensation module 512 can be any numerical calculation module. For example, the proportion conversion module 51 and offset compensation module 512 can be implemented using internal modules or programs of the processor.

The analog-to-digital converters ADC1 to ADC3 convert the analog values of the current sense signal Vsen, input voltage Vin, and output voltage Vo into digital values, respectively. The proportion transformation module 51 performs numerical calculations on the digital values of the current sense signal Vsen, input voltage Vin, and output voltage Vo to obtain the digital value Dslp1 of the replicated signal corresponding to the current sense signal Vsen. The offset compensation module 512 samples the digital value Dslp1 of the replicated signal at a predetermined sampling time ts to obtain the sampling value. The sampling value represents the offset compensation signal corresponding to the current valley of inductance L. Then, the offset compensation module 512 subtracts the sampling value from the digital value Dslp1 of the replicated signal to obtain the digital value Dslp2 of the slope signal. Furthermore, the digital-to-analog converter DAC converts the digital value Dslp2 of the slope signal into a slope signal.

Therefore, the slope signal Vslope provided at the output end of the slope signal generator 301*b* is as shown in the following equation:

$$\text{Vslope} = S20 * Vsen - \text{Voffset} \qquad (13)$$

Wherein, Vsen represents the current sense signal of the inductor, Voffset represents the offset compensation signal corresponding to the current valley of the inductor, and S20 represents the proportion coefficient of the proportion transformation module.

Therefore, the slope signal generator according to this embodiment selects the proportion coefficient of the proportion transformation module in the slope signal generator so that the second circuit parameter k of the slope signal generator is greater than ½, which can always conform to the above equation (4).

Therefore, the slope signal generator of the second embodiment according to the power converter can compensate for input voltage, output voltage, and inductance values dynamically, and select the device parameters of the active and/or passive devices in the slope signal generator so that the slope signal generator always meets the subharmonic suppression conditions.

FIG. 10 shows a working waveform of the slope signal generation shown in FIG. 8 under fluctuation states.

See FIG. 10, during continuous switching cycles, the slope of the slope signal Vslope generated by the slope signal generator 301 in power converter 300 is always inversely proportional to the input voltage Vin, and in reverse proportion to the output voltage Vo, and in reverse proportion to the inductance value of inductance L.

During the first switching cycle from time 0 to time T, the initial slope of the slope signal Vslope is S0. At time t1, if the inductance value of inductance L decreases due to changes in ambient temperature or load conditions, the slope signal generator 301 increases the slope of the slope signal Vslope to S1 during the time period from time t1 to time T. During the second switching cycle from time T to time 2T, the initial slope of the slope signal Vslope is S1. At time t2, if the input voltage Vin increases due to changes in external voltage and/or the output voltage decreases due to changes in external load, the slope signal generator 301 reduces the slope of the slope signal Vslope to S2 during the time period from time t2 to time 2T.

Therefore, the slope signal generator can adaptively adjust the slope of the slope signal within the switching cycle, compensate for fluctuations in input voltage, output voltage, and inductance value quickly and dynamically, to improve the suppression of subharmonic oscillations, and thus enhance the stability of the power converter under different temperature and load conditions.

Further, the slope signal generation circuit utilizes the selection of circuit parameters to adaptively adjust the slope of the slope signal during the switching cycle. Due to the fact that the slope signal generator always meets the subharmonic suppression conditions, it does not need to design different circuit structures for power converters of different specifications (such as different input voltages, different output voltages, and different inductance values). Therefore, the slope signal generator can simplify the circuit structure and significantly reduce circuit design costs.

FIG. 11 shows a schematic circuit diagram of the power converter according to a third embodiment of the present invention. The power converter 400 comprises, e.g., switching transistors Q1 and Q2, inductor L, and control circuit 410.

The power converter 400 uses a BOOST topology, where the inductor L and switch transistor Q1 are connected in series between the input terminal and ground terminal, and the switch transistor Q2 is connected between the intermediate node of the inductor L and the switch transistor Q1 and the output terminal. The input capacitor Ci is connected between the input and ground terminals, and the output capacitor Co is connected between the output and ground terminals to obtain a smooth waveform of the input voltage Vin and output voltage Vo.

Furthermore, the power converter 400 further comprises resistors R101 and R102 connected in series between the output terminal and ground. The voltage feedback signal Vfb of the output voltage Vo is obtained at the intermediate node of resistors R101 and R102. The power converter 400 also comprises an operational amplifier U101 and a sampling resistor Rcs. The sampling resistor Rcs is connected between the inductor Land the switching transistor Q1. The in-phase input terminal and the inverse input terminal of the operational amplifier U101 are respectively connected at the two ends of the sampling resistor Rcs to obtain the current sense signal Vsen of the inductor current iL.

The control circuit 410 of the power converter 400 according to the third embodiment of the present invention is essentially the same as the control circuit 310 of the power converter 300 according to the second embodiment of the present invention, wherein the slope signal generator 301 generates a slope adjustment signal Vsc based on the input voltage Vin, output voltage Vo, and current sense signal Vsen, and the slope signal generator 301 generates a slope signal Vslope based on the slope adjustment signal Vsc, which is not described in detail here.

According to the power converter of this embodiment, the current sense signal Vsen is superimposed with the slope signal Vslope to generate a superimposed signal Vs1. The slope signal Vslope is used to compensate for the slope of the current sense signal Vsen, so that the slope of the superimposed signal Vs1 increases relative to the slope of the current sense signal Vsen, which can reduce the occurrence of subharmonic oscillations and expand the duty cycle range of the switch control signal.

Therefore, the slope signal generator 301 in control circuit 410 can adaptively adjust the slope of the slope signal during the switching cycle, compensate for fluctuations in input voltage, output voltage, and inductance value quickly and dynamically, and improve the suppression of subharmonic oscillations, thus enhancing the stability of the power converter under different temperature and load conditions.

FIG. 12 shows a schematic circuit diagram of the power converter according to a fourth embodiment of the present invention. The power converter 500 comprises, e.g., a switch transistor Q1, a freewheeling diode D1, an inductor L, and a control circuit 510.

The power converter 500 adopts a BOOST topology, where the inductor L and switch transistor Q1 are connected in series between the input terminal and the ground terminal, and the anode of the freewheeling diode D1 is connected between the intermediate node of the inductor L and the switch transistor Q1 and the output terminal, and the cathode of the freewheeling diode D1 is connected to the output terminal. The input capacitor Ci is connected between the input terminal and ground terminal, and the output capacitor Co is connected between the output and ground terminals to obtain a smooth waveform of the input voltage Vin and output voltage Vo.

Further, the power converter 500 further comprises resistors R101 and R102 connected in series between the output terminal and the ground. The voltage feedback signal Vfb of the output voltage Vo is obtained at the intermediate node of resistors R101 and R102. The power converter 500 further comprises an operational amplifier U101 and a sampling resistor Rcs. The sampling resistor Rcs is connected between the inductor L and the switching transistor Q1. The in-phase input terminal and the inverse input terminal of the operational amplifier U101 are respectively connected at the two ends of the sampling resistor Rcs to obtain the current sense signal Vsen of the inductor current iL.

The control circuit 510 comprises a slope signal generator 301, an error amplifier 11, a superimposing module 12, a comparator 13, a resistor R103, capacitors C101, and C102. The in-phase input terminal and the inverse input terminal of error amplifier 11 receive the voltage feedback signals Vfb and the reference voltage Vref respectively. Error amplifier 11, e.g. a transconductance amplifier, is used to convert the differential voltage between the voltage feedback signal Vfb and the reference voltage Vref into the output current. The resistor R103 and capacitor C101 are connected in series between the output terminal of error amplifier 11 and the ground. The output current generated by error amplifier 11 is charged to capacitor C101 through resistor R103, thereby converting the output current generated by error amplifier 11 into a compensation signal Vcomp. Capacitor C102 is connected between the output terminal of error amplifier 11 and ground to obtain a smooth voltage waveform of the compensation signal Vcomp. The slope signal generator 301 is used to generate a slope signal Vslope. The superimposing module 12 superimposes the current sense signal Vsen of the inductor current iL with the slope signal to generate the superimposed signal Vs1. The in-phase input terminal and the inverse input terminal of comparator 13 receive the superimposed signal Vs1 and the compensation signal Vcomp respectively, and compare the two to generate a set signal.

Furthermore, the control circuit 510 further comprises an RS trigger 15, a clock module 14, and a drive module 16. As mentioned above, the control circuit 510 generates a set signal for the RS trigger 15 based on the voltage feedback signal Vbf and the current sense signal Vsen. The clock module 14 is used to generate clock signal CLK as a reset signal for RS trigger 15. The RS trigger 11 generates an inverted output signal QN based on the set signal and the reset signal, which is amplified and buffered by the drive module 16, and then obtains the switch control signal Vgs1.

When switch transistor Q1 is turned on, freewheeling diode D1 is turned off. The input terminal of the power converter 300 receives the input voltage Vin and charges the inductor L. The inductor current iL flows through inductor L and the switch transistor Q1 in sequence. When switch transistor Q1 is turned off, the freewheeling diode D1 is turned on. The inductor L discharges to the output terminal through the freewheeling diode D1, thereby generating an output voltage Vo. During continuous switching cycles, the output capacitor Co filters the output voltage Vo to obtain a smooth voltage waveform.

Furthermore, the control circuit 510 further comprises a sampling and holding circuit 18. The first input terminal of the sampling and holding circuit 18 is connected to the intermediate node of the inductor L and the switch transistor Q1, and the second input terminal is connected to the in-phase output terminal of the RS trigger 15 for receiving the in-phase output signal Q. The output terminal of the sampling and holding circuit 18 is connected to one input terminal of the slope signal generator 301. When the switch transistor Q1 is turned off, the sampling and holding circuit 18 samples the intermediate node voltage between the inductor L and the switch transistor Q1 as the sampling signal for the output voltage Vo. The slope signal generator 301 generates a slope adjustment signal Vsc based on the input voltage Vin, output voltage Vo, and current sense signal Vsen. The slope signal generator 301 generates a slope signal Vslope based on the slope adjustment signal Vsc.

According to the power converter of this embodiment, the current sense signal Vsen is superimposed with the slope signal Vslope to generate a superimposed signal Vs1. The slope signal Vslope is used to compensate for the slope of the current sense signal Vsen, so that the slope of the superimposed signal Vs1 increases relative to the slope of the current sense signal Vsen, which can reduce the occurrence of subharmonic oscillations and expand the duty cycle range of the switch control signal.

Therefore, the slope signal generator 301 in the control circuit 510 can adaptively adjust the slope of the slope signal during the switching cycle, compensate for fluctuations in input voltage, output voltage, and inductance value quickly and dynamically, improve the suppression of subharmonic oscillations, thus enhancing the stability of the power converter under different temperature and load conditions.

In the detailed embodiments described above, only the power converter using BOOST topology is used as an example to further illustrate the working principle of the present disclosure. However, it can be understood that this disclosure is not limited to this.

Based on similar working principles, this disclosure can be directly applied to any type of power converter using either peak current control or valley current control. The power converter comprises a power converter selected from any one of BOOST topology, BUCK topology, BUCK BOOST topology, or FLYBACK topology.

Compared with power converters using BOOST topology, the slope signal generator in power converters using BUCK topology also includes an additional adder module for obtaining Vin−Vo.

The circuit parameters of the slope signal generator are set to meet the subharmonic suppression condition: k is greater than ½.

According to another aspect of the present invention, a slope signal generation method for a power converter is provided, wherein the power converter comprises an inductor and a switch transistor coupled between the input terminal and output terminal. The slope signal generation method comprises: proportionally transforming the current sense signal of the inductor to obtain a replicated signal; and performing offset compensation on the replicated signal to obtain a slope signal, wherein the slope change of the slope signal characterizes the inductance value change of the inductor.

Proportional transformation is performed on the current sense signal of the inductor to obtain a replicated signal; and offset compensation is performed on the replicated signal to obtain a slope signal, wherein the slope change of the slope signal characterizes the change in inductance value of the inductor.

Optionally, the offset compensation comprises: obtaining a sampling signal of the current sense signal at a predetermined sampling time; and subtracting the sampling signal from the current sense signal.

Optionally, the offset compensation comprises: obtaining a sampling signal of the replicated signal at a predetermined sampling time; and subtract the sampled signal from the replicated signal.

Optionally, the sampling time is any time selected between a start time of a switching cycle of the power converter switch and a half-cycle time of the switching cycle of the power converter.

Optionally, numerical calculation is performed in the proportion transformation, and numerical calculation parameters are set to meet the subharmonic suppression condition: k is greater than ½.

Optionally, in the proportion transformation, the parameters of the active and/or passive components in the slope signal generator are set to meet the subharmonic suppression condition: k is greater than ½.

In the slope signal generator of the above embodiment, the multiplication module 411, division module 412, and adder module 413 in the proportion transformation module 41 are sequentially connected. However, the present invention is not limited to this. In the proportion transformation module 41, the order of the multiplication module 411, the division module 412, and the adder module 413 can be changed. For example, when the division module 412, the multiplication module 411, and the adder module 413 are sequentially connected, the replicated signal Vslp shown in above equation (11) can be equivalently obtained.

In the slope signal generator of the above embodiment, the proportion transformation module 41 is sequentially connected to the offset compensation module 22, which performs proportion transformation first and then offset compensation on the replicated signal. Wherein, the sampling and holding module 221 in the offset compensation module 22 obtains the sampling signal of the replicated signal Vslp at the predetermined sampling time, and the subtraction module 222 subtracts the sampling signal from the replicated signal Vslp for offset compensation. However, the present invention is not limited to this. In the slope signal generator, the order of the proportion transformation module 41 and the offset compensation module 22 can be changed. For example, in the case where the offset compensation module 22 and the proportion transformation module 41 are sequentially connected, the current sense signal Vsen is first offset compensated and then proportionally transformed. Wherein, the sampling and holding module 221 in the offset compensation module 22 obtains the sampling signal of the current sense signal Vsen at the predetermined sampling time, and the subtraction module 222 subtracts the sampling signal from the current sense signal Vsen for offset compensation.

The above implementation methods do not constitute restriction on the protection scope of the technical solution. Any modifications, equivalent replacements, and improvements made within the spirit and principles of the above implementation methods shall be included in the protection scope of the technical solution.

What is claimed is:

1. A slope signal generator for a power converter, the power converter comprising an inductor and a switch transistor coupled between an input terminal and an output terminal, and the slope signal generator comprises:

a proportion transformation circuit, for performing proportion transformation on a current sense signal of the inductor to obtain a replicated signal; and an offset compensation circuit, for performing offset compensation on the replicated signal to obtain a slope signal, wherein a slope change of the slope signal represents an inductance value change of the inductor, the slope signal Vslope is expressed by a following formula:

$$\mathrm{Vslope} = k*(a-1)*Vsen - \mathrm{Voffset}$$

wherein Vsen denotes the current sense signal of the inductor, Voffset denotes an offset compensation signal corresponding to a current valley value of the inductor, a denotes a first circuit parameter of the slope signal generator, and k denotes a second circuit parameter of the slope signal generator.

2. The slope signal generator of claim 1, wherein the offset compensation circuit comprises:

a sampling and holding circuit, for obtaining a sampling signal of the current sense signal at a predetermined sampling time; and a subtraction circuit, for subtracting the sampling signal from the current sense signal to perform offset compensation.

3. The slope signal generator of claim 1, wherein the offset compensation circuit comprises:

a sampling and holding circuit, for obtaining a sampling signal of the replicated signal at a predetermined sampling time; and a subtraction circuit, for subtracting the sampling signal from the replicated signal to perform offset compensation.

4. The slope signal generator of claim 2, wherein the sampling time is any time selected between a start time of a switching cycle of the power converter and a half-cycle time of the switching cycle of the power converter.

5. The slope signal generator of claim 2, wherein the offset compensation circuit is configured to sample and calculate a digital value of the current sense signal or the replicated signal at the sampling time of the switching cycle, and providing the slope signal after the sampling time of the switching cycle.

6. The slope signal generator of claim 2, wherein an input terminal of the sampling and holding circuit is connected to a first switch, and an output terminal of the subtraction circuit is connected to a second switch; the first switch and the second switch perform switching synchronously, so as to sample and calculate an analog value of the current sense signal or the replicated signal at the sampling time of the switching cycle, and provide the slope signal after the sampling time of the switching cycle.

7. The slope signal generator of claim 1, wherein the first circuit parameter is related to an input voltage and an output voltage of the power converter.

8. The slope signal generator of claim 7, wherein the slope signal generator further comprises:

an analog-to-digital converter, for converting an analog value of the current sense signal into a digital value; and a digital-to-analog converter, for converting the digital value of the slope signal into an analog value, wherein, the proportion transformation circuit is configured to receive the digital value of the current sense signal, and perform numerical calculation on the current sense signal to obtain the digital value of the replicated signal.

9. The slope signal generator of claim 8, wherein the first circuit parameter and the second circuit parameter of the slope signal generator are proportion coefficients of the proportion transformation circuit, and the proportion coefficients of the proportion transformation circuit are set to meet a harmonic suppression condition: k is greater than ½.

10. The slope signal generator of claim 1, wherein the first circuit parameter of the slope signal generator is a predetermined parameter related to a rated input voltage and a rated output voltage of the power converter.

11. The slope signal generator of claim 10, wherein the proportion transformation circuit comprises:

an operational amplifier, the second circuit parameter of the slope signal generator is a proportion coefficient of the operational amplifier.

12. The slope signal generator of claim 11, wherein parameters of passive components in the proportion transformation circuit are set to meet a harmonic suppression condition: k is greater than ½.

13. The slope signal generator of claim 1, wherein the first circuit parameter of the slope signal generator is a real time parameter related to an input voltage and an output voltage collected by the power converter in real time.

14. The slope signal generator of claim 13, wherein the proportion transformation circuit comprises:

a multiplication circuit, for multiply the current sense signal and the output voltage to obtain a first signal;

a division circuit, for dividing the first signal by the input voltage to obtain a second signal; and an adder circuit, for adding the second signal to the current sense signal to obtain a third signal.

15. The slope signal generator of claim 13, wherein the proportion transformation circuit comprises:

a division circuit, for dividing the current sense signal by the input voltage to obtain a first signal;

a multiplication circuit, for multiplying the first signal and the output voltage to obtain a second signal; and an adder circuit, for adding the second signal to the current sense signal to obtain a third signal.

16. The slope signal generator of claim 15, wherein the multiplication circuit and the division circuit comprise an active device selected from a multiplier, respectively; the division circuit, the multiplication circuit, and the adder circuit respectively comprise a passive device selected from at least one of a resistor and a capacitor.

17. The slope signal generator of claim 16, wherein a parameter of the active device and/or the passive device of the proportion transformation circuit is set to meet a subharmonic suppression condition: k is greater than ½.

18. A power converter, comprising:

an input terminal and an output terminal, receiving an input voltage and providing an output voltage, respectively;

an inductor and a switch transistor coupled between the input terminal and output terminal; and a control circuit, for generating a switch control signal of the switch transistor, charging the inductor with the input voltage in on state of the switch transistor, and discharging the inductor in off state of the switch transistor, so as to generate the output voltage at the output terminal, wherein, the control circuit comprises the slope signal generator according to claim 1.

19. The power converter of claim 18, wherein the power converter uses peak current control manner or valley current control manner.

20. The power converter of claim 19, wherein the power converter comprises any one of the power converters selected from the BOOST topology, BUCK topology, BUCK-BOOST topology, and FLYBACK topology.

* * * * *